United States Patent
Uno

(10) Patent No.: US 10,261,492 B2
(45) Date of Patent: Apr. 16, 2019

(54) NUMERICAL CONTROLLER THAT CONTROLS AN OUTPUT VALUE IN FEEDBACK CONTROL

(71) Applicant: FANUC CORPORATION, Minamitsuru-gun, Yamanashi (JP)

(72) Inventor: Kousuke Uno, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 35 days.

(21) Appl. No.: 15/487,878

(22) Filed: Apr. 14, 2017

(65) Prior Publication Data
US 2017/0300030 A1    Oct. 19, 2017

(30) Foreign Application Priority Data

Apr. 15, 2016 (JP) .................................. 2016-081690

(51) Int. Cl.
G05B 19/31 (2006.01)
B23Q 15/12 (2006.01)
G05B 19/416 (2006.01)

(52) U.S. Cl.
CPC ............. *G05B 19/31* (2013.01); *B23Q 15/12* (2013.01); *G05B 19/4166* (2013.01); *G05B 2219/42073* (2013.01); *G05B 2219/43158* (2013.01)

(58) Field of Classification Search
CPC ..... G05B 19/4163; G05B 19/31; B23Q 15/12
See application file for complete search history.

(56) References Cited

U.S. PATENT DOCUMENTS

| 3,665,493 | A | * | 5/1972 | Glowzewski | ...... | G05B 19/4163 318/561 |
| 2003/0167100 | A1 | * | 9/2003 | Fujita | ................. | G05B 19/4065 700/175 |
| 2004/0167659 | A1 | * | 8/2004 | Scherer | .............. | G05B 19/4163 700/173 |
| 2007/0046238 | A1 | * | 3/2007 | Xu | ..................... | G05B 19/4163 318/571 |
| 2010/0030366 | A1 | * | 2/2010 | Scherer | .............. | G05B 19/4163 700/173 |
| 2016/0089759 | A1 | * | 3/2016 | Morita | ................. | B23Q 17/008 700/173 |

FOREIGN PATENT DOCUMENTS

JP       2012-032869 A    2/2012

* cited by examiner

*Primary Examiner* — Vincent H Tran
(74) *Attorney, Agent, or Firm* — RatnerPrestia

(57) ABSTRACT

A numerical controller, which is capable of controlling an output value without causing delay or the like in feedback control, includes an instruction program analysis unit configured to analyze a program instruction and generate instruction data instructing movement of the axis, and a speed computation unit configured to start speed computation processing to compute a feeding speed of the axis by the instruction data or an override for the feeding speed by feedback control such that the spindle load value becomes constant. The speed computation unit is configured to update a feature amount intended for elimination of deviation between a desired value and a feedback value in the feedback control when another override that is different than the override that has been computed is output. The feature amount is updated to a value obtained by back calculation from the other override that is to be output.

1 Claim, 5 Drawing Sheets

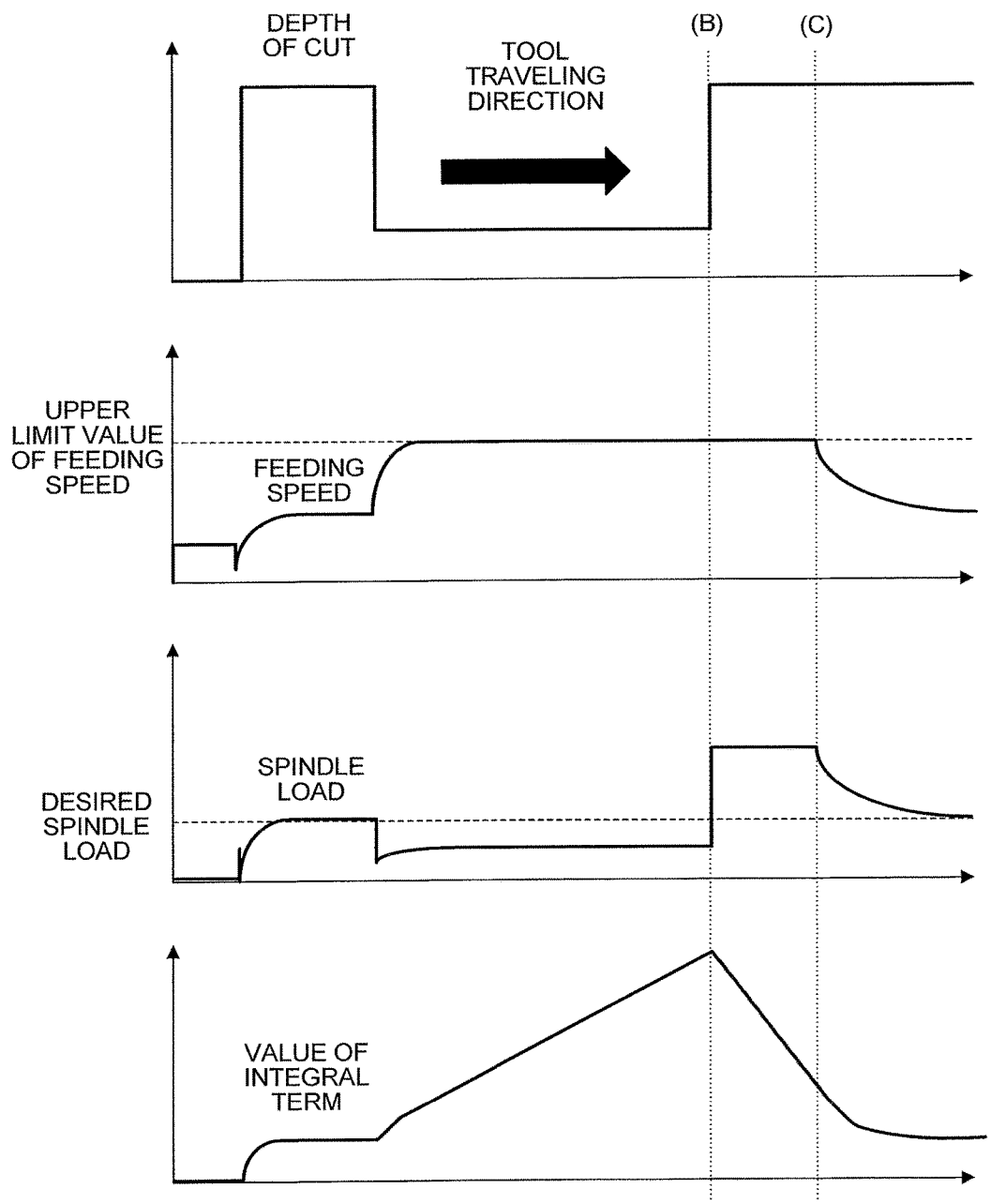

NUMERICAL CONTROLLER THAT CONTROLS AN OUTPUT VALUE IN FEEDBACK CONTROL

BACKGROUND OF THE INVENTION

1. Field of the Invention

The present invention relates generally to a numerical controller and in particular to a numerical controller that controls an output value in feedback control.

2. Description of the Related Art

Some existing techniques realize improvement of cutting speed and longer service life of cutting tools through feeding speed control such that a load of a spindle becomes constant (for example, see Japanese Patent Application Laid-Open No. 2012-032869). In such a control method, in order to control the load so that it becomes constant, a cutting volume is increased by increasing a feeding speed when the cutting volume per unit time is small, and the cutting volume is decreased by decreasing the feeding speed when the cutting volume is large and the spindle load is high. When this control method is simply applied to a machine tool, the feeding speed can be limitlessly increased depending on a processing program, the shape of an item to be processed, and the like. When the cutting volume rapidly increases while the feeding speed is increased, discrete time control may cause damage to the tool and/or the item to be processed before the feeding speed is decreased.

As a consequence, it is necessary to restrict to a certain extent the change in the feeding speed. However, when the output value in the feedback control is simply restricted and the output value is overwritten by the maximum value or the minimum value, it may happen that an integral term or a feature amount equivalent to it shows unintended change. Various control methods may be contemplated to control the feeding speed, among which PID control is widely used as a typical control scheme to control and maintain a certain value so that it takes a constant value. In the context of the present invention, one embodiment will be discussed based on an example where the control of an override by PID control is used as the control method to control the feeding speed.

An output obtained by the PID control can be typically calculated by the following first mathematical expression.

$$O(t) = K_p e_L(t) + \int_{t_0}^{t} K_i e_L(t) dt + K_d \frac{d}{dt} e_L(t) + C \quad \text{[Expression 1]}$$

$O(t)$: output value
$e_L(t)$: difference between an objective value and a current value (time t) of a target of control
$K_p$: gain of a proportional term of the PID control
$K_i$: gain of an integral term of the PID control
$K_d$: gain of a derivative term of the PID control
C: offset of the PID control When the feeding speed is controlled such that the load of the spindle becomes constant, the output value $O(t)$ is defined as the feeding speed (override), $e_L(t)$ is defined as a difference between the objective spindle load and the spindle load at the time t, appropriate values are specified as the constants, and thereby it is made possible to bring the spindle load closer to the objective value. In a state where cutting is not performed, in other words, in a state of idle running of the spindle, the spindle load does not change even when the feeding speed is increased, so that it is desirable that the control be carried out only during the cutting, in other words, only when the spindle load reaches and remains to be at or over a predetermined value. It should be noted that the time at which the PID control is started is defined as $t_0$ in the first mathematical expression.

FIG. 4 illustrates an example of a block diagram of the feedback control using the DID control of the embodiment. When the feedback control illustrated in FIG. 4 is applied to a machining tool that performs the numerical control for the purpose of controlling the spindle load so as to be constant as described above, the output value $O(t_n)$ of the current control period is computed for each control period of the feedback control in accordance with the objective spindle load and the feedback L(t) of the spindle load of the actual processing and thus the control is carried out. In other words, one round of the operational flow as depicted in the block diagram of FIG. 4 takes place for each control period. Here, when the focus is made on the block associated with the integration, the value output from the integration block at the time $t_n$ is represented by the following second mathematical expression if no particular operation is made.

$$\int_{t_0}^{t_n} K_i e_L(t) dt = \int_{t_0}^{t_{n-1}} K_i e_L(t) dt + \int_{t_{n-1}}^{t_n} K_i e_L(t) dt \quad \text{[Expression 2]}$$

As can be seen from the second mathematical expression, a value output by the integration block calculated at the time $t_n$ uses a value output by the integration block at the time $t_{n-1}$, and a value output by the integration block at the time $t_{n-1}$ likewise uses a value output by the integration block at the time $t_{n-2}$. A feature amount that bridges the control periods to take over a value in this manner, regardless of whether the takeover takes place in the form of a sum or a product, is typically intended for use in elimination of deviation between the value of the target of control (spindle load) and the desired value thereof. Such a feature amount takes different values every time the calculation is performed as long as the deviation exists between the value of the target of control and the desired value thereof. As a consequence, when the state where such deviation cannot be eliminated continues, the value will change considerably.

FIG. 5 illustrates the result of simulation of the PID control conducted with appropriate numerical values specified as the constants. In FIG. 5, a set of graphs are illustrated in which the horizontal axes represent a feed amount (distance) of a tool and the vertical axes represents a depth of cut, a feeding speed, a spindle load value, and a value of an integral term, respectively. It will be appreciated from FIG. 5 that, when the PID control is implemented, the feeding speed of the tool changes in accordance with change in the depth of cut of the tool with respect to a workpiece and, as the distance of the feeding of the spindle load increases, in other words, as the time passes, the value approaches the objective spindle load. However, at the timing (A) at which the depth of cut rapidly increases, the spindle load becomes considerably deviated from the objective spindle load. If there is no available scheme for estimating the depth of cut in advance, a region where the depth of cut is large is entered while the feeding speed is high. As a result, in order to prevent the deviation of the spindle load, it is necessary to specify a maximum value for the feeding speed. In view of this, FIG. 6 illustrates a case where an upper limit value for the feeding speed is specified under the same condition as that of FIG. 5 to simply restrict the output value.

FIG. 6 illustrates a set of graphs having the same scale as that of FIG. 5. It will be appreciated from FIG. 6 that, as the result of the upper limit value of feeding speed having been specified, the feeding speed is restricted such that it does not become larger than the upper limit value. Also, it will be appreciated that, at the timing (B), the spindle load does not become large compared with the timing (A) of FIG. 5. However, from the timing (B) to the timing (C), the feeding speed continues to be identical with the upper limit value, so that the spindle load remains to be higher than the objective spindle load. This is because of the following reasons. Specifically, the spindle load is decreased as a result of the specification of the upper limit value upon the speed and deviation between the objective spindle load and the spindle load becomes large. As a result, the value of the integral term becomes large compared with the case of FIG. 5, it takes longer for the integral term to be decreased from the timing (B) to the timing (C), and it takes longer for the feeding speed, which is an output value, to be decreased. In this manner, simple specification of the upper limit value for the feeding speed to restrict the output causes occurrence of the feeding speed sticking to the upper limit value, which acts as a factor that causes damage to the tools and/or workpieces, and overheating of the spindle motor and/or the feed axis motor.

As discussed above, the problem in the feedback control of a numerical controller is that, when the output value is restricted or controlled, the "feature amount intended for the purpose of elimination of deviation between the feedback value and the desired value" (the value calculated by the integral term of the first mathematical expression (the second term of the right-hand side)), which is represented by an integral or a sum or product bridging control periods in the feedback control, is unintentionally increased or decreased. Also, another problem is that the unintended change in the feature amount may cause damage to machining tools, working tools and/or items to be processed.

SUMMARY OF THE INVENTION

In view of the above, an object of the present invention is to provide a numerical controller that is capable of controlling an output value without causing delay or the like in carrying out feedback control.

The numerical controller of the present invention solves the above-identified problems by performing back calculation of an integral or a feature amount similar to the integral and updating the integral or the feature amount such that the feedback control outputs the desirable output value when the output value from the feedback control is restricted or controlled.

Also, the numerical controller in accordance with the present invention controls a machine that includes a spindle and a axis driving the spindle and carries out feedback control to control a moving speed of the axis on the basis of a program instruction such that a spindle load value of the spindle becomes constant. The numerical controller includes an instruction program analysis unit configured to analyze the program instruction and generate instruction data instructing movement of the axis; and a speed computation unit configured to start speed computation processing to compute a feeding speed of the axis by the instruction data or an override for the feeding speed by feedback control such that the spindle load value becomes constant. The speed computation unit is configured to update a feature amount intended for elimination of deviation between a desired value and a feedback value of a mathematical expression used in the feedback control when another override that is different than the override that has been computed is output. The feature amount is updated by a value obtained by back calculation from the other override that is output.

According to the present invention, unintended increase and decrease in an integral or a feature amount similar to it can be eliminated and tracking performance of the control can be improved. As a result, it is made possible to prevent damage to machining tools, working tools and/or items to be processed, overheating of motors and the like.

BRIEF DESCRIPTION OF THE DRAWINGS

The above and other objects and features of the present invention will become apparent from the following description of the embodiments with reference to the accompanying drawings, in which:

FIG. 6 is a diagram illustrating changes in the depth of cut, the override, the spindle load value, and the value of the integral term in the PID control with the output restricted.

DETAILED DESCRIPTION OF THE PREFERRED EMBODIMENTS

Embodiments of the present invention are described below with reference to the drawings.

Figure 1:
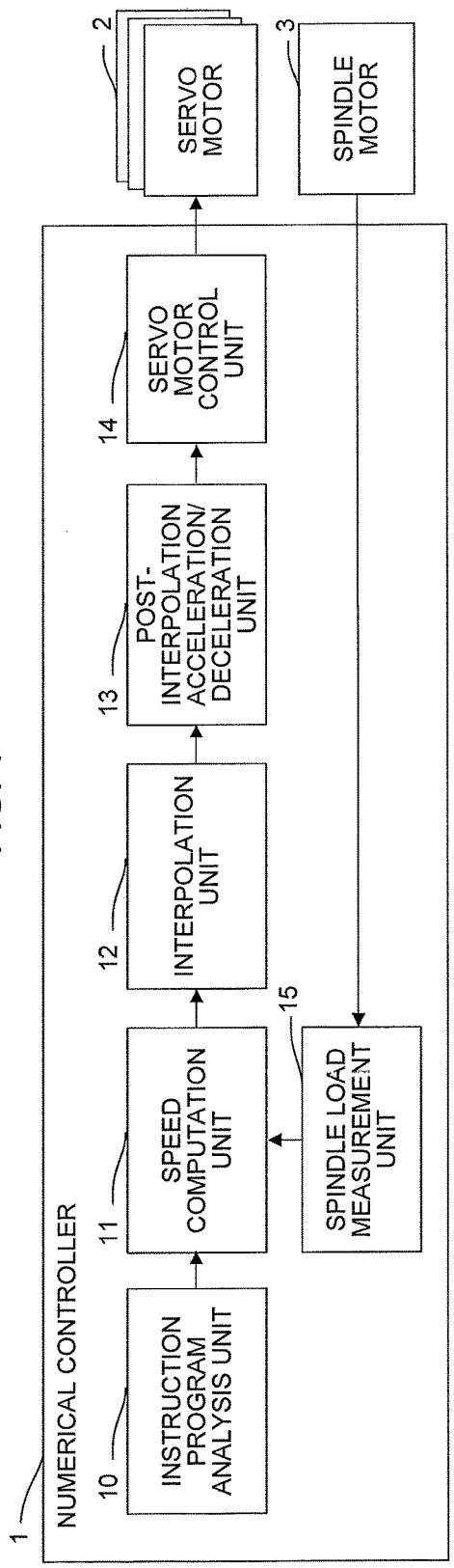
FIG. 1 is a schematic block diagram of a numerical controller in accordance with an embodiment of the present invention.
Figure 4:
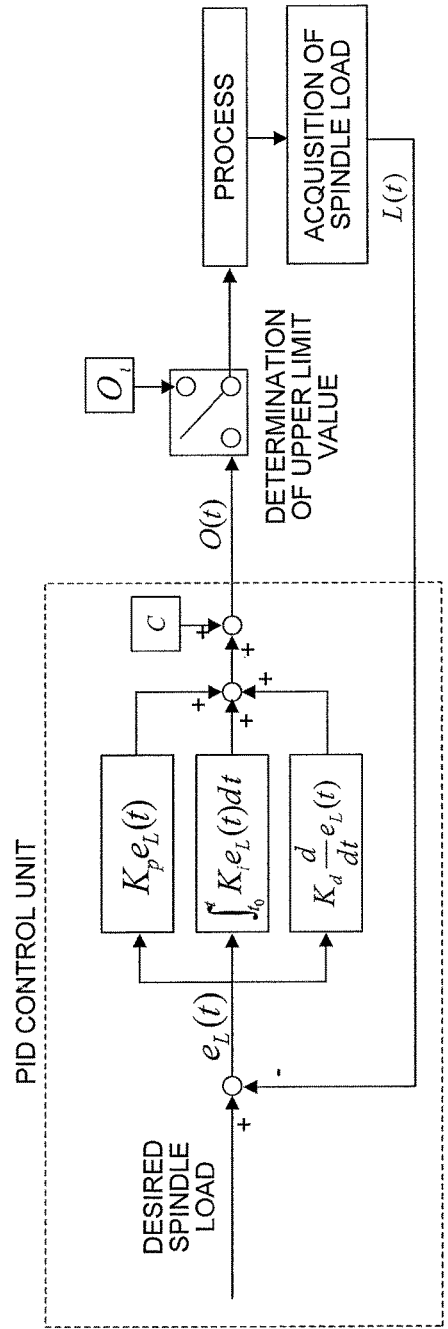
FIG. 4 illustrates an example of a block diagram of feedback control using PID control.

FIG. 1 is a functional block diagram of a numerical controller in accordance with one embodiment of the present invention. The numerical controller 1 in accordance with this embodiment includes an instruction program analysis unit 10, a speed computation unit 11, an interpolation unit 12, a post-interpolation acceleration/deceleration unit 13, a servo motor control unit 14, and a spindle load measurement unit 15.

The instruction program analysis unit 10 is configured to read, sequentially, blocks that instruct operations of a machine which is the target of control (the blocks are read from a program or the like stored in not-shown memory unit); carry out analysis of the blocks that have been read; create instruction data to instruct movement of a axis driven by a servo motor 2 based on the result of the analysis; and output the created instruction data to the speed computation unit 11.

The speed computation unit 11 is configured to compute an override for the feeding speed of the instruction data input from the instruction program analysis unit 10 such that the spindle load becomes constant. The override is computed on the basis of a spindle load of a spindle motor 3 measured by the spindle load measurement unit 15. Also, the speed computation unit 11 is configured to output, to the interpolation unit 12, the instruction data with the feeding speed adjusted on the basis of the computed override.

The interpolation unit 12 is configured to generate interpolation data on the basis of the instruction data with the adjusted feeding speed input from the speed computation unit 11. The interpolation data is generated as a point for each interpolation period on a path of the instruction by the instruction data. The interpolation unit 12 is also configured to output the generated interpolation data to the post-interpolation acceleration/deceleration unit 13.

The post-interpolation acceleration/deceleration unit 13 is configured to compute the speeds of the respective axes in each interpolation period on the basis of the interpolation data input from the interpolation unit 12, and output result data to the servo motor control unit 14.

Finally, the servo motor control unit 14 is configured to control the servo motor 2 that drives the axis of the machine which is the target of control on the basis of the output by the post-interpolation acceleration/deceleration unit 13.

It should be noted that FIG. 1 does not explicitly illustrate other functional elements which may or should exist therein such as a spindle motor control circuit and an amplifier for the spindle motor.

The computation of the speed carried out by the speed computation unit 11 will be described below. It is envisaged that the PID control in the context of the present invention includes the following extension. (Extension) Any appropriate value can be assigned to an integral term at any appropriate time, and such an integral term is notated by an indefinite integral symbol with its lower endpoint omitted.

According to the above-identified extension, the present invention uses the following third mathematical expression as the mathematical expression of the PID control.

$$O(t) = K_p e_L(t) + \int^t K_i e_L(t) dt + K_d \frac{d}{dt} e_L(t) + C \quad \text{[Expression 3]}$$

In the PID control carried out under the condition that the above-described upper limit value is specified for the output value, the speed computation unit 11 provided in the numerical controller 1 of this embodiment assigns a substitute value I (which is computed by the following fourth mathematical expression) to the integral term at the time t at which the output value O(t) computed by the third mathematical expression exceeded the upper limit value $O_t$. After that, the substitute value calculated for each control period in accordance with the fourth mathematical expression is assigned to the integral term of the third mathematical expression and $O_t$ is output in place of O(t) while the output value O(t) computed by the third mathematical expression is larger than the upper limit value $O_t$. The substitute value I computed by the fourth mathematical expression is a value obtained by back calculation from the value of the override that has been output (the upper limit value $O_t$).

$$I = O_t - K_p e_L(t) - K_d \frac{d}{dt} e_L(t) - C \quad \text{[Expression 4]}$$

Figure 2:
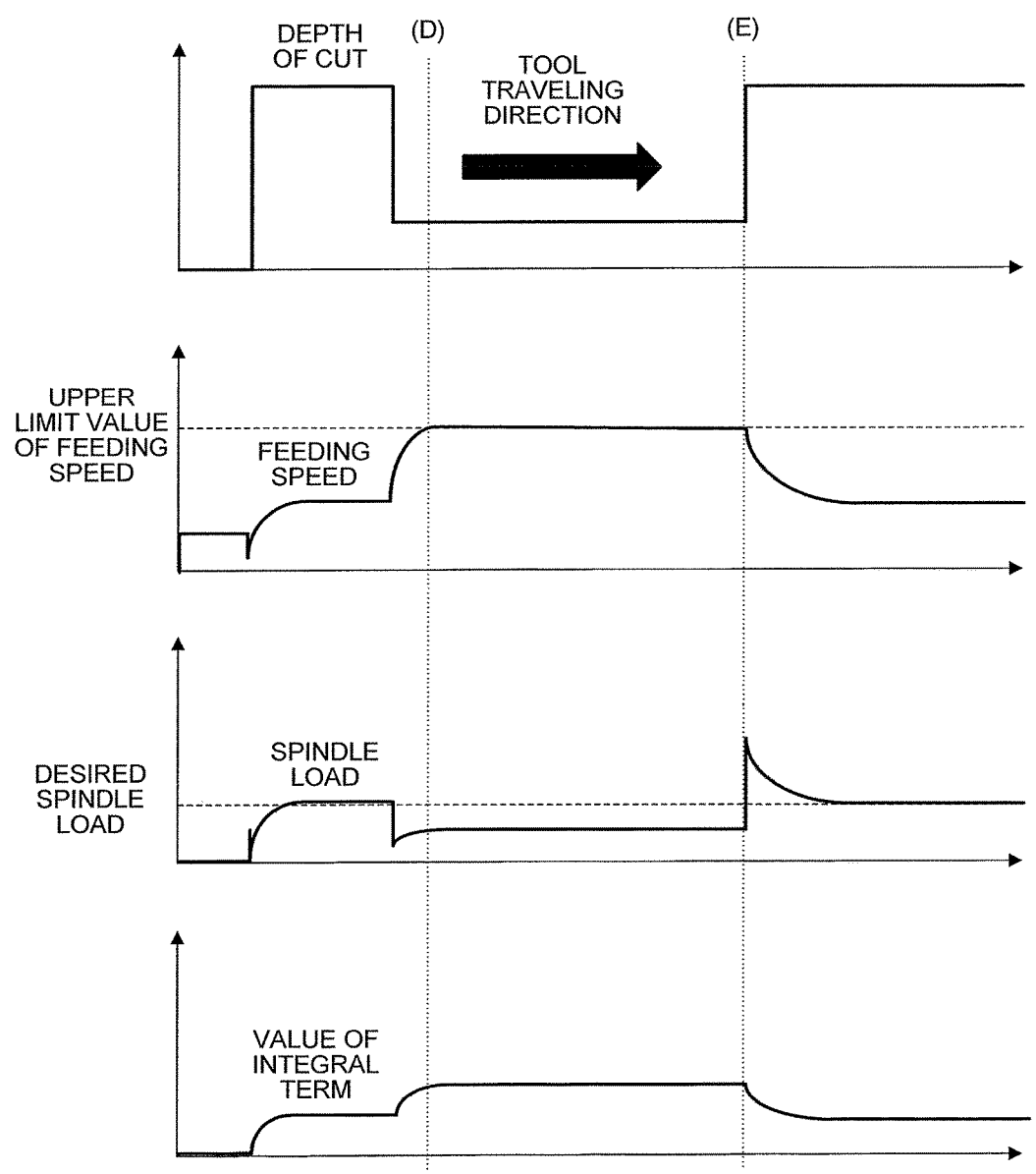
FIG. 2 is a diagram illustrating changes in a depth of cut, an override, a spindle load value, and a value of an integral term in PID control by the numerical controller in accordance with the embodiment of the present invention.

The result of simulation of a case where the above-described processing is applied under the same conditions as those of FIG. 6 is illustrated in FIG. 2. As illustrated in FIG. 2, the output is restricted by the numerical controller 1 of this embodiment in the same or similar manner as in FIG. 6. Meanwhile, according to the numerical controller 1, a process is added according to which a value which ensures that the output after the restricting is output is assigned to the integral term when the calculation of PID control is performed. As a result, even when the feeding speed reaches the upper limit value at the timing (D), the value of the integral term does not increase as in FIG. 6 and remains to be a constant value. Also, although the spindle load at the moment the depth of cut increased at the timing (E) becomes equivalent to that in FIG. 6, the feeding speed decreases immediately after the timing (E) and the spindle load also decreases. In this manner, according to the numerical controller 1 of this embodiment, it will be appreciated that unintended increase or decrease of the integral term is prevented and thereby responsiveness of control is increased.

Figure 3:
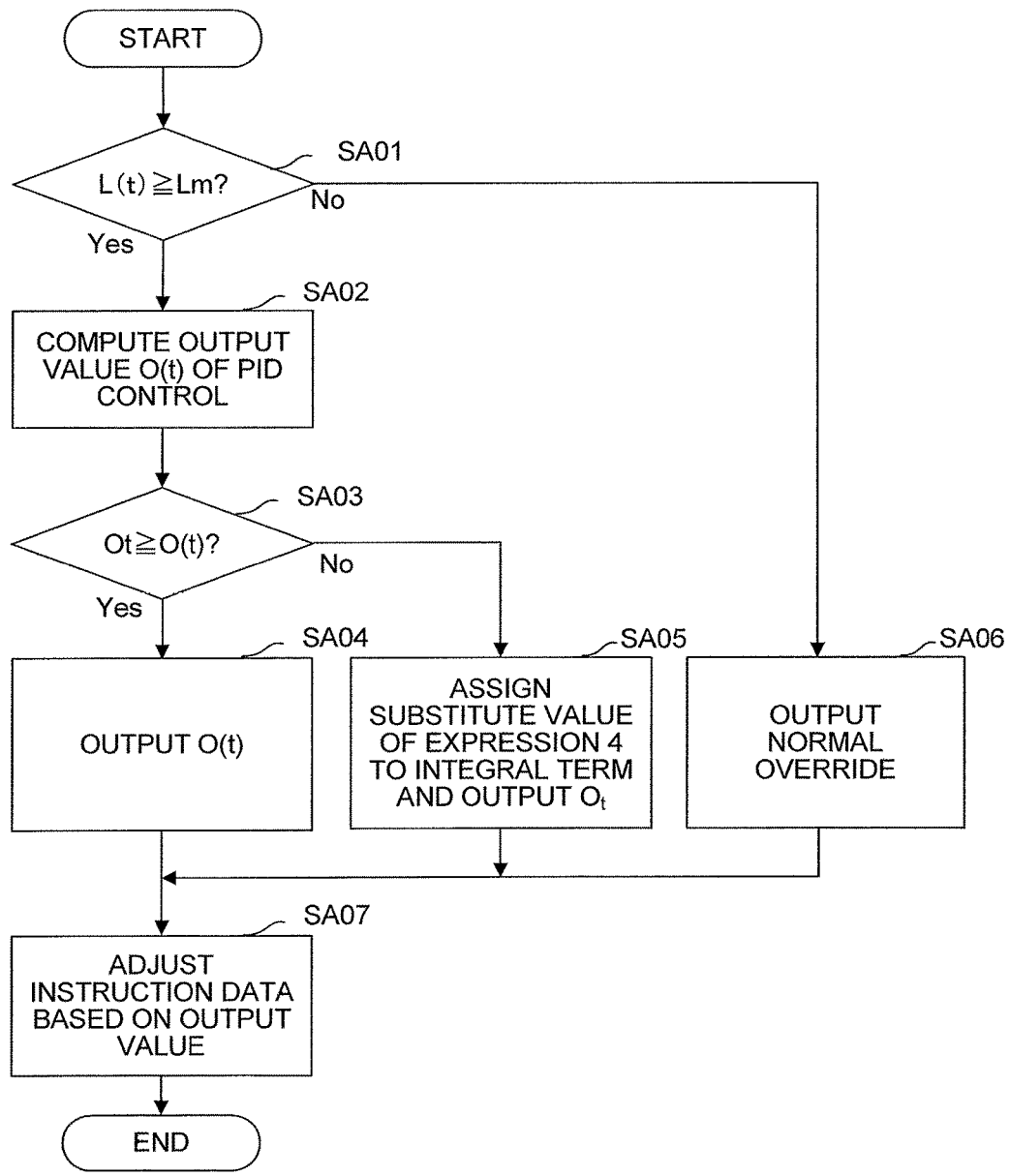
FIG. 3 is a flowchart of processing executed by a speed computation unit 11 provided in the numerical controller 1 of FIG. 1 in accordance with the embodiment of the present invention.
Figure 5:
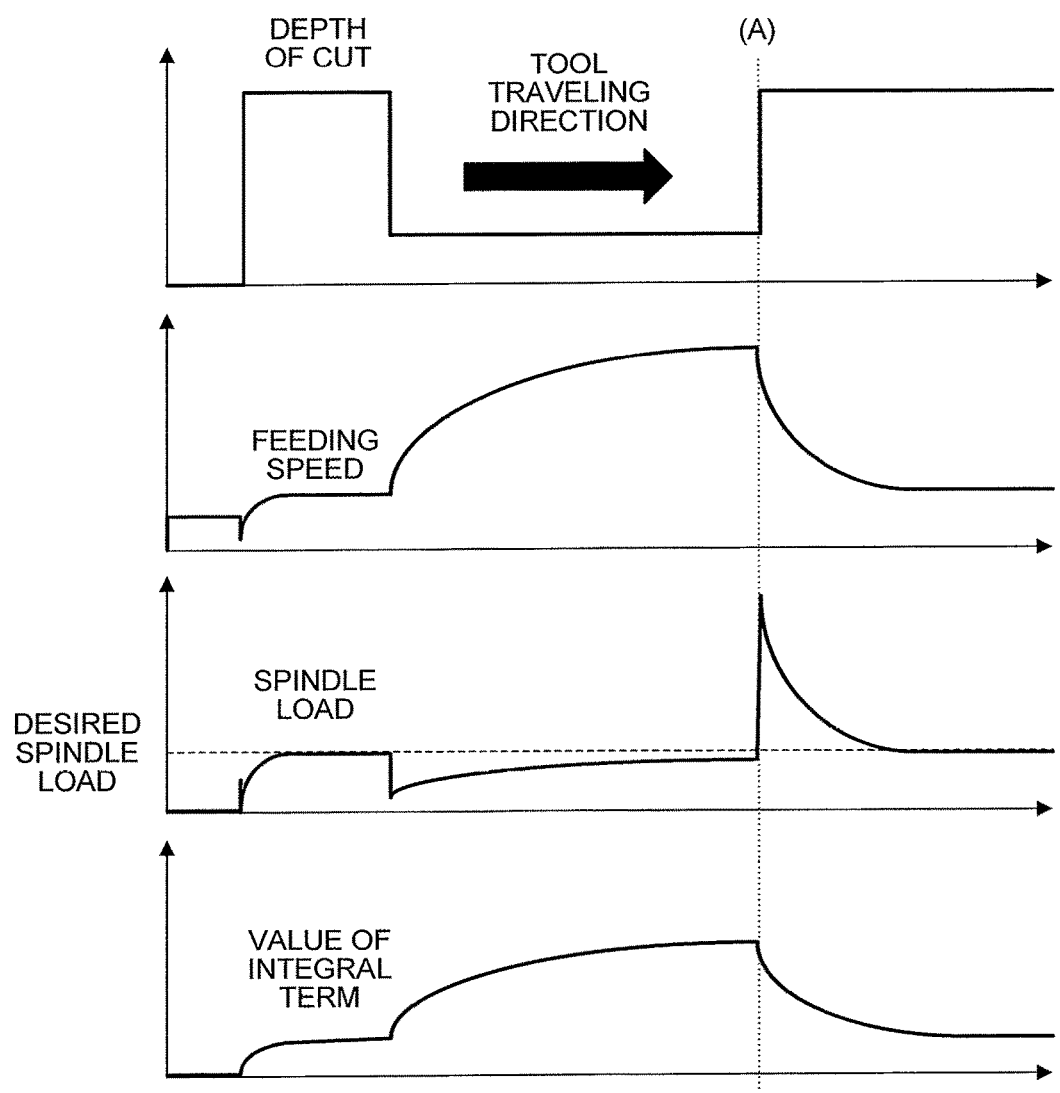
FIG. 5 is a diagram illustrating changes in a depth of cut, an override, a spindle load value, and a value of an integral term in normal PID control.

FIG. 3 is a flowchart of the processing carried out for each control period by the speed computation unit 11 in accordance with this embodiment. It should be noted that, in the flowchart of FIG. 3, L(t) is a value of the current spindle load, Lm is a value of the spindle load at which the control method introduced by the present invention becomes effective, O(t) is the output value computed by the PID control, and $O_t$ is the predetermined upper limit value for the output value.

[Step SA01] The speed computation unit 11 determines whether or not the current spindle load value L(t) of the spindle motor 3 measured by the spindle load measurement unit 15 is equal to or larger than the spindle load value Lm which is specified in advance and at which the control method of this embodiment becomes effective. When the current spindle load value L(t) is equal to or larger than the spindle load value Lm, the process proceeds to the step SA02, or otherwise proceeds to the step SA06.

[Step SA02] The speed computation unit 11 computes the output value O(t) by the feedback control by the PID control.

[Step SA03] The speed computation unit 11 determines whether or not the output value O(t) computed by the PID control in the step SA02 is equal to or lower than $O_t$ which is the predefined upper limit of the output value. When O(t) is equal to or lower than $O_t$, the process proceeds to the step SA04. When O(t) exceeds $O_t$, the process proceeds to the step SA05.

[Step SA04] The speed computation unit 11 defines O(t) that has been computed in the step SA02 as the output value.

[Step SA05] The speed computation unit 11 assigns the substitute value of the fourth mathematical expression to the integral term and defines $O_t$ as the output value.

[Step SA06] The speed computation unit 11 outputs the normal override.

[Step SA07] The speed computation unit 11 adjusts the instruction data on the basis of the computed output value and outputs the adjusted instruction data to the interpolation unit 12, and ends the processing for the control period of this time.

Although the embodiment of the present invention has been described in the foregoing, the present invention is not limited to the above-described embodiment. The present inventions can be implemented in various forms with appropriate modifications made thereto.

For example, descriptions of the above-described embodiment have been provided on the assumption that the present invention is applied to the feedback control based on the PID control. In the case of the PID control, the integral term corresponds to the "feature amount intended for the purpose of elimination of the deviation between the feedback value and the desired value" which is represented by a sum or a product bridging control periods in the feedback control, so that the above descriptions are provided on the assumption that the substitute value is assigned to the integral term.

Meanwhile, when the present invention is to be applied to other control schemes, the control schemes should be configured such that a substitute value obtained by back calculation from the output value is assigned to a term corresponding to the "feature amount intended for the purpose of elimination of the deviation between the feedback value and the desired value."

What is claimed is:

1. A numerical controller adapted to control a machine that includes a spindle and an axis driving the spindle on the basis of a program instruction and carry out feedback control to control a moving speed of the axis such that a load value of the spindle becomes constant, the numerical controller comprising:
   an instruction program analysis unit configured to analyze the program instruction and generate instruction data instructing movement of the axis; and
   a speed computation unit configured to start speed computation processing to compute a feeding speed of the axis by the instruction data or an override for the feeding speed by feedback control such that the spindle load value becomes constant, the speed computation unit being configured to compute an integral term used in the feedback control based on the spindle load value and compute the override based on the integral term, and when another override that is different than the override is defined as an output value, assign a substitute value computed by the output value to the integral term.

* * * * *